US010661955B2

(12) United States Patent
Ivosevic et al.

(10) Patent No.: US 10,661,955 B2
(45) Date of Patent: May 26, 2020

(54) ADHESIVE PATCH AND METHOD OF USE IN A PACKAGING SYSTEM

(71) Applicant: Becton, Dickinson and Company, Franklin Lakes, NJ (US)

(72) Inventors: Milan Ivosevic, Kinnelon, NJ (US); Noel Titus, New York, NY (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 28 days.

(21) Appl. No.: 15/383,197

(22) Filed: Dec. 19, 2016

(65) Prior Publication Data

US 2017/0101239 A1  Apr. 13, 2017

Related U.S. Application Data

(62) Division of application No. 14/575,378, filed on Dec. 18, 2014, now abandoned, which is a division of
(Continued)

(51) Int. Cl.
*B65D 71/00* (2006.01)
*F16B 11/00* (2006.01)
(Continued)

(52) U.S. Cl.
CPC .......... *B65D 71/0085* (2013.01); *B65B 17/02* (2013.01); *B65D 19/0069* (2013.01); *B65D 19/38* (2013.01); *B65D 21/0205* (2013.01); *B65D 21/0227* (2013.01); *B65D 71/0088* (2013.01); *B65D 79/02* (2013.01); *F16B 11/006* (2013.01); *B65D 2203/10* (2013.01); *B65D 2519/00273* (2013.01);
(Continued)

(58) Field of Classification Search
USPC .................... 206/460; 53/531, 540, 541, 147
See application file for complete search history.

(56) References Cited

U.S. PATENT DOCUMENTS 2,578,583 A * 12/1951 O'Brien ............ B65D 71/0085
206/460
2,744,624 A * 5/1956 Hoogstoel .............. B65D 65/44
156/208
(Continued)

FOREIGN PATENT DOCUMENTS

CA    2137903 C    1/1994
DE    3538119 A1   4/1987
(Continued)

OTHER PUBLICATIONS

Adhesion & Cohesion, Adhesives.org, Sealants.org, accessed from the Internet Oct. 21, 2014 at http://www.adhesives-sealants/science-of-adhesion/adhesion-cohesion, 2 pages.
(Continued)

*Primary Examiner* — Jacob K Ackun
(74) *Attorney, Agent, or Firm* — Servilla Whitney LLC

(57) ABSTRACT

An adhesive patch and method of use thereof for forming a plurality of stackable items into a vertically stacked load are described. The method may include delivering an aligned stack of items positioned on a pallet for eventual transportation while minimizing the misalignment of the stackable items.

4 Claims, 4 Drawing Sheets

Related U.S. Application Data application No. 13/455,322, filed on Apr. 25, 2012, now abandoned.

(60) Provisional application No. 61/479,112, filed on Apr. 26, 2011.

(51) Int. Cl.
   *B65D 79/02* (2006.01)
   *B65D 19/38* (2006.01)
   *B65B 17/02* (2006.01)
   *B65D 19/00* (2006.01)
   *B65D 21/02* (2006.01)

(52) U.S. Cl.
   CPC .............. *B65D 2519/00293* (2013.01); *B65D 2519/00323* (2013.01); *B65D 2519/00781* (2013.01); *B65D 2571/00067* (2013.01); *Y10T 156/10* (2015.01); *Y10T 428/21* (2015.01); *Y10T 428/24802* (2015.01); *Y10T 428/28* (2015.01)

(56) References Cited

U.S. PATENT DOCUMENTS

| | | | |
|---|---|---|---|
| 3,113,673 A * | 12/1963 | Stein | B65D 5/4275 206/813 |
| 3,160,341 A | 12/1964 | Cherney | |
| 3,221,876 A * | 12/1965 | Currie | B65D 71/0085 206/431 |
| 3,734,280 A | 5/1973 | Amneus et al. | |
| 3,983,645 A | 10/1976 | Rycrof | |
| 3,987,901 A * | 10/1976 | Dullinger | B65C 9/10 206/451 |
| 4,053,049 A | 10/1977 | Beauvais | |
| 4,055,249 A | 10/1977 | Kojima | |
| 4,069,927 A * | 1/1978 | Taylor | B65D 67/02 206/821 |
| 4,365,710 A * | 12/1982 | Swanson | B65D 5/42 108/51.3 |
| 4,441,611 A * | 4/1984 | Sommariva | B65D 71/0085 206/431 |
| 4,505,389 A * | 3/1985 | Whiteside | B65D 71/0085 206/460 |
| 4,741,935 A * | 5/1988 | Sheehan, Jr. | B65D 5/0236 428/35.7 |
| 5,131,540 A * | 7/1992 | Torterotot | B65D 71/0085 206/427 |
| 5,141,106 A * | 8/1992 | Adams | B65D 5/5495 206/256 |
| 5,178,271 A | 1/1993 | Adams et al. | |
| 5,180,056 A * | 1/1993 | Adams | B65D 5/5495 206/256 |
| 5,269,645 A * | 12/1993 | Winski | B65G 59/005 156/182 |
| 5,491,956 A * | 2/1996 | Donnelly | B65B 11/025 53/399 |
| 5,496,599 A * | 3/1996 | Schwartz | B29C 45/766 428/343 |
| 5,607,056 A | 3/1997 | Whiteside | |
| 5,657,870 A * | 8/1997 | Schottle | B65D 71/0085 206/308.1 |
| 5,728,440 A | 3/1998 | Good | |
| 5,887,717 A | 3/1999 | Anderson et al. | |
| 5,895,540 A * | 4/1999 | David | B65B 17/02 156/226 |
| 5,938,036 A * | 8/1999 | Villemure | B65B 11/585 206/596 |
| 6,016,912 A | 1/2000 | Weder | |
| 6,620,308 B2 | 9/2003 | Gilbert | |
| 6,880,313 B1 | 4/2005 | Gessford | |
| 7,392,905 B2 | 7/2008 | Andersen | |
| 9,926,120 B2 * | 3/2018 | Dapper | B65D 71/063 |
| 2004/0089573 A1 * | 5/2004 | Weder | B65D 85/505 206/423 |
| 2005/0167314 A1 * | 8/2005 | Andersen | B65B 15/00 206/460 |
| 2006/0032427 A1 | 2/2006 | Ishii et al. | |
| 2007/0007158 A1 * | 1/2007 | Cordes | B65D 71/0085 206/431 |
| 2007/0023313 A1 * | 2/2007 | Sandberg | B29C 65/3456 206/460 |
| 2010/0065561 A1 | 3/2010 | Valley, III et al. | |
| 2011/0156910 A1 * | 6/2011 | Pieper | G08B 13/128 340/572.7 |

FOREIGN PATENT DOCUMENTS

| | | |
|---|---|---|
| DE | 102005003562 A1 | 8/2006 |
| DE | 102005062213 A1 | 6/2007 |
| EP | 1560009 A1 | 8/2005 |
| JP | 54-001200 A | 1/1979 |
| JP | 58-193284 A | 5/1985 |
| JP | H07508252 A | 9/1995 |
| JP | 03-275459 B2 | 4/2002 |
| JP | 2007230574 A | 9/2007 |
| JP | 2008-526649 A | 7/2008 |
| WO | 94/00362 A1 | 1/1994 |

OTHER PUBLICATIONS

Non-Final Office Action in U.S. Appl. No. 13/455,322, dated Jul. 24, 2014, 9 pages.
PCT International Search Report and Written Opinion in PCT/US2012/034947, dated Jul. 31, 2012, 10 pages.
PCT IPRP in PCT/US2012/034947, dated Nov. 7, 2013, 8 pages.

\* cited by examiner

ADHESIVE PATCH AND METHOD OF USE IN A PACKAGING SYSTEM

CROSS-REFERENCE TO RELATED APPLICATIONS

This application is a divisional of U.S. patent application Ser. No. 14/575,378, filed Dec. 18, 2014, which is a divisional of U.S. patent application Ser. No. 13/455,322, filed Apr. 25, 2012 which claims priority under 35 U.S.C. § 119(e) to U.S. Provisional Application No. 61/479,112 filed Apr. 26, 2011, the disclosures of which are incorporated herein by reference in their entirety.

TECHNICAL FIELD

The invention relates to an adhesive patch and methods for its use for grouping, stacking and connecting items and thereafter delivering the stack of items. In particular, the invention relates to an adhesive patch and method for forming a plurality of stackable items into a vertically stacked load.

BACKGROUND

It is of considerable importance to manufacturers of consumer goods that their products be shipped to the end-user in a most economical, efficient, convenient and effective manner. The consumer goods are typically transported from the manufacturer in bulk, as pallet loads of stacked boxes, each of which may contain a substantial number of units of the product.

When large numbers of stackable products must be transported in large quantities to another location, the products may be arranged in a tight grouping, or array of products. Each array of products can be stacked on a pallet in layers, the pallets subsequently being transported by freight hauling compartments known in the art, e.g., for truck, rail, sea or air vessels.

While in transit, an unstable pallet can topple over leading to significant increases with respect to product delivery time and cost. When an unstable pallet topples over, the safety of those nearby is jeopardized.

Stretch wrap or stretch film is a highly stretchable plastic film that is wrapped around items. The elastic recovery keeps the items tightly bound. In contrast, shrink wrap is applied loosely around an item and shrinks tightly with heat. It is frequently used to unitize pallet loads but also may be used for bundling smaller items. The most common stretch wrap material is linear low-density polyethylene or LLDPE, which is produced by copolymerization of ethylene with alpha-olefins, the most common of which are butene, hexene and octene. The use of higher alpha-olefins (hexene or octene) gives rise to enhanced stretch film characteristics, particularly in respect of elongation at break and puncture resistance. Many films have about 500% stretch at break but are only stretched to about 100-300% in use. Once stretched, the elastic recovery is used to keep the load tight.

Shrink wrap, also shrinkwrap or shrink film, is a material made up of polymer plastic film. When heat is applied it shrinks tightly over whatever it is covering. Heat can be applied with a hand held heat gun (electric or gas) or the product and film can pass through a heat tunnel on a conveyor. Shrink wrap is commonly used as an overwrap on many types of packaging, including cartons, boxes, beverage cans and pallet loads. A variety of products may be enclosed in shrink wrap to stabilize the products, unitize them, keep them clean or add tamper resistance.

Shrink wrapping is currently the industry standard for grouping arrays of product and stretch wrap is currently the industry standard for securing loose stacks of products stacked on pallets. In shrink wrapping, the product to be shipped is wrapped with a material, usually a film, which shrinks when warmed, thereby securing the wrapping to the material and generating a secured shipping bundle. In stretch wrapping, the array of stacked products is wrapped with film that is stretched and the tension in the stretched film serving to hold the stacked products together.

Once the bundle wrapped by the stretch wrapping and shrink wrapping process has reached its shipping destination, the stretch wrap and shrink wrap material must be removed from the bundle by manual removal, including cutting, and the wrap must be discarded.

Thus, there are a number of disadvantages associated with stretch wrapping and shrink wrapping, including the use of heat to shrink the wrapping material, which is both energy intensive but may also ruin the consumer product. The machinery required for stretch wrapping and shrink wrapping requires extensive use of factory floor space. Both stretch wrapping and shrink wrapping require a large amount of material which increases overall packaging costs, as well as, poses environmental and disposal concerns.

In stretch wrapped units, vibration during shipping can cause the containers on the lower layers to shift closer together, creating an unstable palletized unit having an uneven load distribution, which puts undue stress on the containers. The damaged containers can cost the customer money and produce an unsafe situation for the customer.

Therefore, there is a need in the packaging art for an alternative to conventional packaging methods that provides an economical and efficient packaging system to connect multiples boxes together for eventual transport by providing significant materials saving and decrease in overall packaging costs.

SUMMARY

In one embodiment of the present invention an adhesive patch is provided for application to the outer surface of multiple packaging units having cohesive and adhesive strength that is sufficient to connect, align and hold packaging units together, the patch comprising a non-water soluble adhesive on a first major surface having an adhesive strength sufficient to hold the packaging units together where the adhesive strength is equal to or greater than the cohesive strength of the packaging unit surfaces; and a non-adhesive second major surface disposed on a side opposite side the first major surface.

In a specific embodiment of the present invention, an adhesive patch is provided further comprising a sensor device to detect exposure of a shipment to extreme temperatures, radiation, or moisture.

In a specific embodiment of the present invention, an adhesive patch is provided wherein a sensor device is embedded within the adhesive patch.

In a specific embodiment of the present invention, an adhesive patch is provided having embedded electronic components for scanning, detecting, product counting or similar purposes.

In another embodiment of the present invention, an adhesive patch is provided having an embedded sensor device that is a radio frequency identification (RFID) sensor.

In one or more embodiments of the present invention, an adhesive patch is provided having a diameter of at least about 0.3-20 inches.

In one or more embodiments of the present invention, an adhesive patch is provided having a surface area of about 0.09-400 inches$^2$.

In another embodiment of the present invention, an adhesive patch is provided wherein the non-adhesive second major surface optionally includes at least one of product information and branding information.

In another embodiment of the present invention, an assembly of packaging boxes arranged for transport is provided comprising a first unitized cube of four boxes in stacked side-by side alignment forming an intersection at the abutting four corners of the four boxes; and a first adhesive patch located on the proximal side of the intersection of the four corners, a second adhesive patch located on the distal side of the intersection of the four corners.

In another embodiment of the present invention, an assembly of packaging boxes arranged for transport is provided further comprising a second unitized cube of four boxes in stacked side-by side alignment forming an intersection at the abutting four corners of the four boxes; a third adhesive patch located on the proximal side of the intersection of the four corners of the second unitized cube; a fourth adhesive patch located on the distal side of the intersection of the four corners of the second unitized cube; and the first unitized cube and the second unitized cube placed in adjacent side-by side alignment on a pallet forming an interface between the first unitized cube and the second unitized cube.

In another embodiment of the present invention, an assembly of packaging boxes arranged for transport is provided further comprising a fifth adhesive patch located on the proximal side of the interface between the first unitized cube and the second unitized cube; and a sixth adhesive patch located on the proximal side of the interface between the first unitized cube and the second unitized cube.

In one embodiment of the present invention, a method is provided for stacking a plurality of stackable items onto a pallet comprising (a) placing four boxes in stacked side-by side alignment having an intersection at the abutting four corners of the four boxes; (b) placing a first adhesive patch at the proximal side of the intersection of the four corners; and (c) placing a second adhesive patch at the distal side of the intersection of the four corners to form a first unitized cube.

In another embodiment of the present invention, a method is provided for stacking a plurality of stackable items onto a pallet further comprising forming a second unitized cube by placing four additional boxes in stacked side-by side alignment forming an intersection at the abutting four corners of the four boxes; placing a third adhesive patch at the proximal side of the intersection of the four corners of the second unitized cube; and placing a fourth adhesive patch of claim 1 at the distal side of the intersection of the four corners of the second unitized cube.

In another embodiment of the present invention, a method is provided for stacking a plurality of stackable items onto a pallet further comprising placing the first unitized cube and the second unitized cube in adjacent side-by side alignment on a pallet forming an interface between the first unitized cube and the second unitized cube; placing a fifth adhesive patch at the proximal side of the interface between the first unitized cube and the second unitized cube, and placing a sixth adhesive patch at the proximal side of the interface between the first unitized cube and the second unitized cube.

In another embodiment of the present invention, a method is provided for stacking a plurality of stackable items onto a pallet further comprising creating a pallet load of unitized cubes; stacking the pallet load directly on top of each other to form vertical columns such that the corners of the boxes are stacked on top of each other from box to box; and repeating the aforementioned steps to create a stack of boxes until the full desired height of the pallet load is achieved.

In another embodiment of the present invention, a method is provided for stacking a plurality of stackable items onto a pallet further comprising placing an adhesive patch on any non-edge forming interface between two or more boxes not already connected.

In another embodiment of the present invention, a method is provided for stacking a plurality of stackable items onto a pallet further comprising placing an adhesive patch at the interfaces between two or more boxes for only the two layers of cubes closest to the pallet.

In another embodiment of the present invention, a method is provided for stacking a plurality of stackable items onto a pallet further comprising placing an adhesive patch on any columns of boxes internal to the outer layer of boxes on the pallet on which adhesive patches are placed.

In another embodiment of the present invention, a method is provided for stacking a plurality of stackable items onto a pallet further comprising placing an adhesive patch at the interfaces between two or more boxes on the top of the topmost layer of adjacent boxes stacked on the pallet.

DETAILED DESCRIPTION

Figure 1:
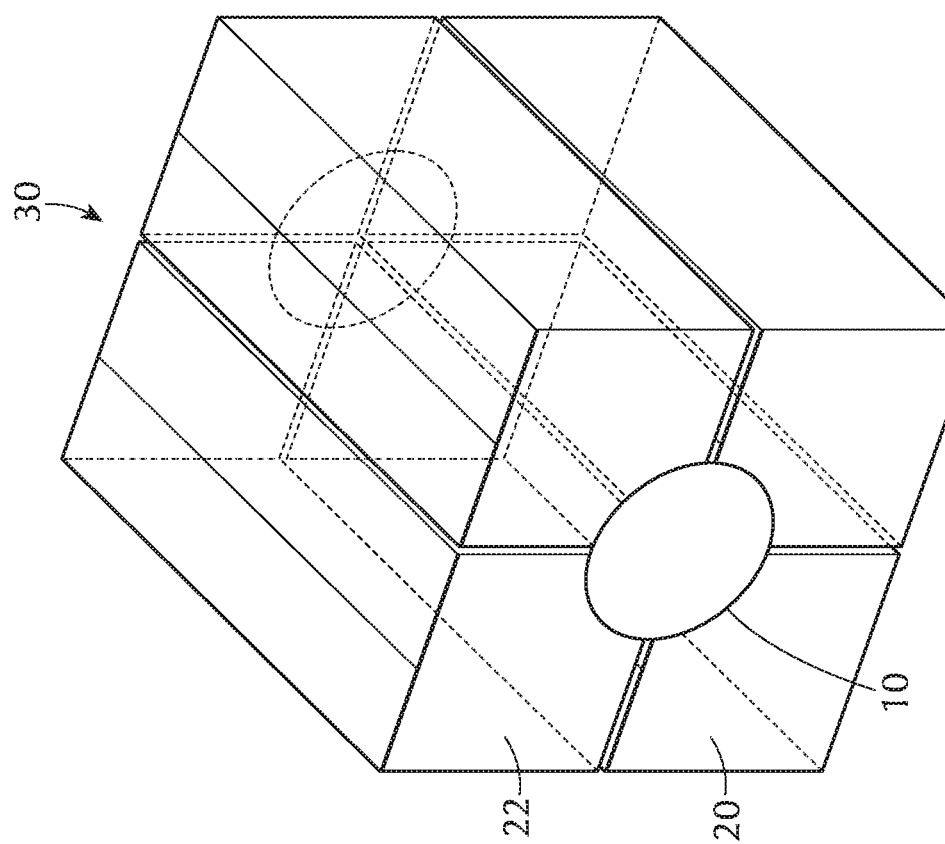
FIG. 1 is a perspective view illustrating visual representations of the adhesive patches used to form unitized cubes for a pallet layer according to the present invention.

Before describing several exemplary embodiments of the invention, it is to be understood that the invention is not limited to the details of construction or process steps set forth in the following description. The invention is capable of other embodiments and of being practiced or being carried out in various ways.

According to one or more embodiments, an adhesive patch and method of use thereof in a packaging system are provided for the shipping of palletized stacked products that keeps the product containers neatly stacked in vertical columns on the pallet. Accordingly, in one aspect, an adhesive patch and method of use thereof in a packaging system allows the product containers to move slightly during shipping but restricts greater lateral and vertical movement to prevent damage to the individual containers. The adhesive patches can link the unitized product containers into cubes and series of unitized cubes into columns to help distribute and control the abusive forces that occur during shipping and handling. The packaging system can be used for palletized products and allows for stacking of multiple palletized units. The method and system can be used to form a plurality of stackable unitized cubes into a vertically stacked column of unitized cubes that simultaneously loads and aligns stacked unitized cubes in a vertical fashion for eventual transport.

According to one or more embodiments, an adhesive patch and method for use thereof in a packaging system provide an economical and efficient packaging system providing significant materials saving. Such systems and methods can provide a method for using an adhesive patch wherein 80% less material are used to connect the same number of cardboard boxes as conventional methods currently used in the packaging industry, e.g., shrink wrap. In addition, the adhesive patch, system and methods can provide significant energy saving when compared to conventional methods currently used in the packaging industry, e.g., elimination of the heating process that is used with shrink wrap process and replacing it with small amount of adhesive that is used with the adhesive patches of the present invention.

The adhesive patches, systems and methods can be used for a product, box, or article that could be of any configuration that is stacked for shipment or storage on a pallet. The term "product" as used in the present specification includes, but is not limited to, a box, can, carton, containers or pouches. The term "box" is not intended to be limiting and is used as a generic for stackable materials being stacked together.

In one or more embodiments of the present invention, the adhesive patch includes, but is not limited to, adhesive on a first major surface, an opposite non-adhesive second major surface, and any conventional readily removable liner. The adhesive patch is provided with a liner bonded to the adhesive surface until the adhesive patch is ready for use. The liner also prevents the surfaces from sticking together when the tape is wound upon itself to form a roll or arranged in a stack. Typical liners include a backing formed of, for example, paper or a polymeric film such as polyethylene, polypropylene, polystyrene, or polyester, or combinations of any of these materials, which is coated with a release agent such as silicone, a fluorochemical, or other low surface energy based release material. A specific example of a liner is silicone coated paper. The non-adhesive second major surface of the patch may be printed with brand indicia, or other product information. Each liner can be individually removed from adhesive first major surface. By removing the liner, a corresponding portion of an adhesive surface is exposed to allow the patch to be affixed to a substrate.

The present invention comprises an adhesive patch that could be placed over an interface between two, three, four or more boxes to connect the boxes. The adhesive and cohesive strength of the adhesive patch of the present invention may be used to connect, group and align multiple boxes. The number of boxes that can be connected is dependent on shape of the box cross-section, shipping requirements, and other factors.

FIG. 1 shows an embodiment of the invention wherein a minimum of two adhesive patches 10 can be used to connect four cardboard boxes 20, 22 to form a unitized cube 30 of boxes by placing them over the locations where the four corners, (one from each respective box) intersect. One adhesive patch is placed on the proximal, or front, side of the intersection of the four corners, and another adhesive patch is placed on the distal, or rear, side where four box corners form a cross-shaped interface.

Figure 3:
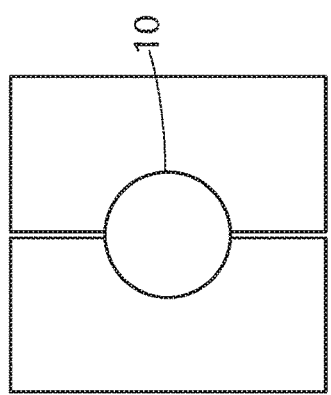
FIG. 3 is a top plan view of the unitized cube shown in FIG. 2.
Figure 4:
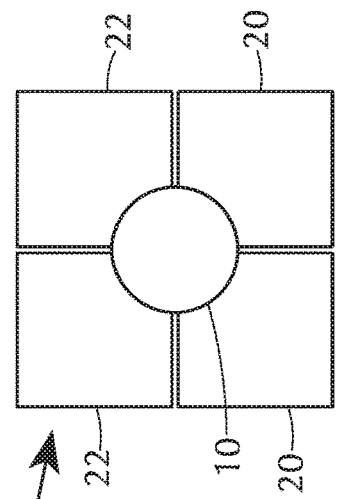
FIG. 4 is an end view of the unitized cube shown in FIG. 2.
Figure 2:
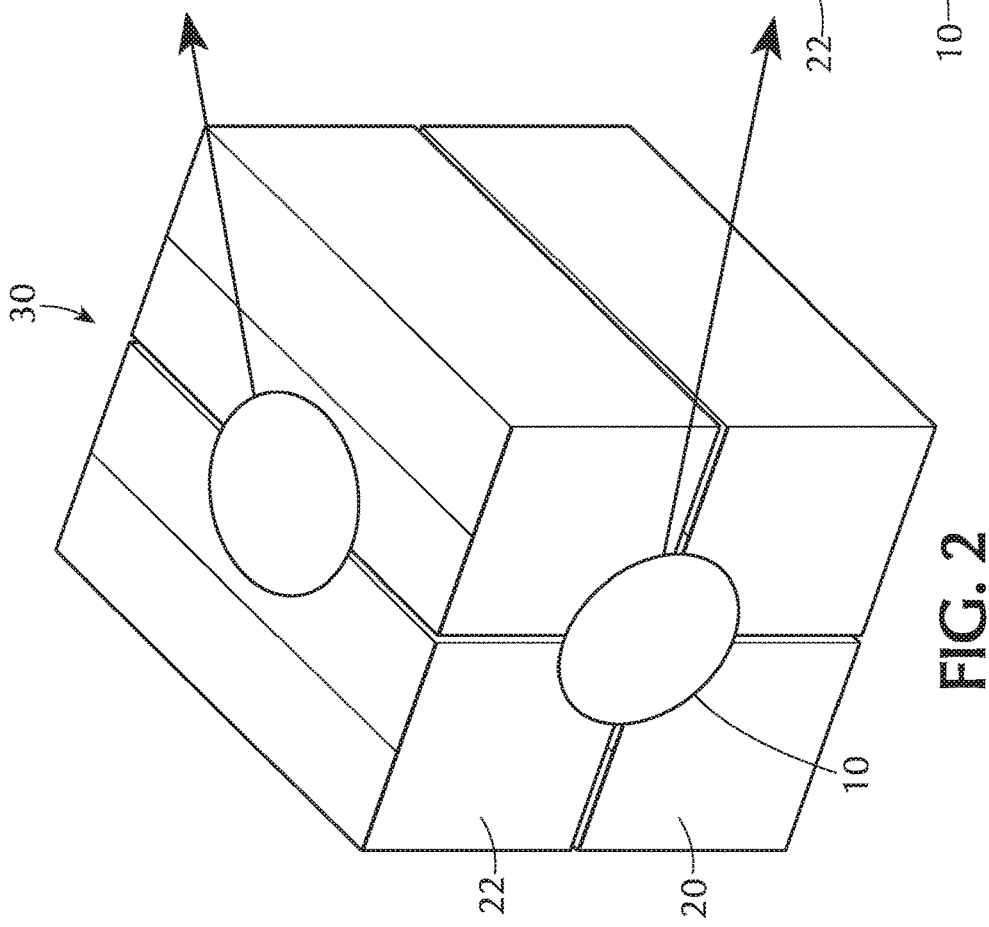
FIG. 2 is a perspective view illustrating an alternative configuration of the adhesive patches used to form unitized cubes for a pallet layer according to the present invention.

FIGS. 2-4 show an alternative embodiment of the invention, wherein the adhesive patch 10 of the invention is placed on four boxes 20, 22 arranged in a cross-like pattern to form a unitized cube 30 consisting of two lower boxes 20 and two upper boxes 22. The pattern ensures equal and counteracting forces stabilizing the articles and prevents them from being shifted when subjected to vibrational force. As shown in FIG. 3, an adhesive patch 10 may be used to secure the two upper boxes 26 at their top portion. This pattern of packaging may be chosen for mechanically demanding fields of application, e.g., transport of articles by trucks over wide distances with relatively high speed.

In one or more embodiments, adhesive patches may also be placed at the edges of the outer boxes of the cube or pallet where two box corners meet. The adhesive patches placed at the edges of the outer boxes of the cube can have L-shaped cross-section for improved adhesion thus providing additional stability to the unitized cube or pallet. In one embodiment of the present invention, the adhesive patch may be composed of reinforced fiber board with adhesive coated inner surfaces, which also helps to protect the boxes and unitized cube from side impact loads that could damage the boxes and products contained inside the boxes. In one or more embodiment, circular shaped, T-shaped, rectangular shaped, cross-shaped, pentagon shaped and L-shaped adhesive patches may be applied to the intersection of corners of the boxes.

When assembling boxes into a unitized cube or subsequently assembling the unitized cubes onto a pallet for eventual transport, the location and number of adhesive patches can be optimized. In a specific embodiment, at least two adhesive patches are required to hold four boxes together in a unitized cube. When unitized cubes are placed on pallets, all interfaces between two or more boxes not already connected and held together by adhesive patches, should be held together using adhesive patches with the exception of interfaces along edges. In a specific embodiment, adhesive patches are required to be placed at the interfaces for only the two layers of cubes closest to the pallet to optimize the number of adhesive patches. In one embodiment, any columns of boxes internal to the outer layer of boxes on the pallet on which adhesive patches are placed could be additionally secured by connecting to adjacent boxes on the top of the topmost layer of boxes stacked on the pallet. This is shown in FIGS. 2 and 3, in which the top of the unitized cube 30 has a single adhesive patch 10 connecting the top surfaces of the upper boxes 22 of the unitized cube 30.

Figure 5:
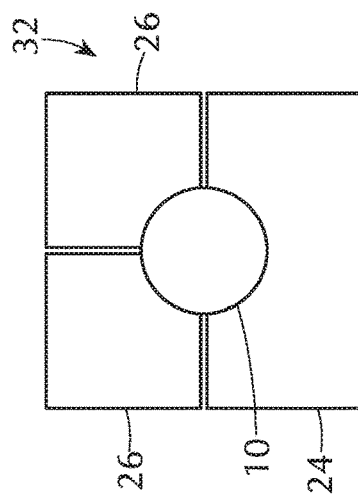
FIG. 5 is an end view of an alternative configuration of a unitized cube of boxes.

As can be seen from FIG. 5, the configuration of boxes does not have to be symmetrical. As shown in FIG. 5, unitized cube 32 comprises three boxes. A single lower box 24 provides the base of the unitized cube 32. Upper boxes 26 form the top portion of the unitized cube 32. Adhesive patch 10 is placed at the intersection of the two corners of the upper boxes 26 and the top portion of lower box 24. Of course, similar to the configuration shown in FIG. 3, an adhesive patch 10 may be used to secure the two upper boxes 26 at their top portion.

Different adhesive patches with respect to size, shape, color, etc., could be used for holding the boxes together to form a unitized cube. Likewise, different adhesive patches with respect to size, shape, color, etc., could be used for holding the cubes together in a pallet. Since the pallet level external forces and loads are higher than that experienced at a cube level, the surface area of the adhesive patches used to hold the cubes in the pallet together is made larger than the adhesive patches used to hold the boxes in a cube together. The larger surface area provides greater adhesive forces which are necessary to withstand pallet level loads. In another embodiment of the present invention, different size adhesive patches help distinguish between adhesive patches used to hold boxes in cubes together and cubes in the pallet together, allowing an end user to cut the adhesive patch based on whether a unitized cube or individual box needs to be taken from pallet.

In another embodiment of the present invention, adhesive patches may be used to allocate boxes into cubes of product, which is the minimum order quantity or smallest shipping unit size.

In another embodiment of the present invention, an adhesive patch of the present invention may also be used to hold adjacent boxes together and prevent their separation of the adjacent boxes by providing a resistive force that arises from their resistance to tensile elongation when subjected to external forces. The adhesive force in the shear plane produced between the adhesive patch and the surface of the box serves to counter the tensile force of the adhesive patch.

In another embodiment of the present invention, an adhesive patch of the present invention used to hold adjacent boxes together also helps to keep the edges of boxes aligned vertically thus contributing to the overall structural integrity of the pallet since the edges of the boxes supports a large proportion of support of the compressive loads from product on top of the boxes. The alignment of edges along a vertical line improves the overall compressive load capacity of the pallet. It is known to one of skill in the art that if the box edges are misaligned in the cube, they will be misaligned when the cubes are placed on the pallet and thus resulting in sections of the box, other than the edge, not designed to hold compressive loads supporting the top load, reducing the compressive load bearing capacity of the total pallet. This will result in lower pallet loads and possibly lower transportation efficiency.

In one or more embodiment of the present invention, adhesive patches used to hold cubes together in a pallet serve multiple functions. For example, adhesive patches used to hold cubes together in a pallet resist lateral forces that arise due to changes in inertia on the boxes during transportation. These lateral forces are resisted by the adhesive forces acting in a plane transverse to the plane of the adhesive patch.

In one embodiment, adhesive patches used to hold unitized cubes together also prevent separation of boxes arising from forces due to vertical vibration.

In one embodiment, adhesive patches used to hold unitized cubes together also align the edges of cubes so as to provide the compressive load resistance to support top loads on the pallet during double stacking. By aligning the edges of boxes and providing resistive forces to lateral, vertical and other loads that the cube and pallet are subjected to the adhesive patches provide a stabilization system for transportation that groups boxes in desired quantities.

In another embodiment of the present invention, a method for using the adhesive patch of the present invention is provided comprising placing a first adhesive patch on the proximal, or front, side of the intersection of the four corners of stacked boxes; placing a second adhesive patch on the distal, or rear, side where four box corners form a cross-shaped interface to form a unitized cube. The unitized cube is then placed on a pallet. After a pallet load has been partially "built", that is unitized cube of boxes is placed in a predetermined pattern, at least one adhesive patch is placed at the intersection of two unitized cubes of boxes to add stability to the partially palletized load. The boxes are stacked directly on top of each other to form vertical columns such that the strongest parts of the boxes, the corners, are stacked on top of each other from box to box. The stacking of unitized cubes of boxes continues until the full desired height of the pallet load is achieved. It is understood that pattern for arranging the boxes and the unitized cubes will be determined to minimize the number of patches needed to achieve the packaging function desired.

A pallet layer templates may be used to define patterns of unitized cubes which can be arranged to form a full layer of boxes on the pallet. Any of a variety of possible arrangements of the unitized cubes which can accommodate any of a number of different case sizes depending upon the size of a pallet base and the dimensions of the cases to be placed onto the pallet base including, but not limited to, box shape, box length, box width, and box orientation.

In another embodiment of the present invention, the method is carried out by a machine or robotic arm that applies the first and second adhesive patches at the respective proximal and distal side of the interface of the four boxes to form a unitized cube and subsequent palletizing of unitized cubes. In one or more embodiments of the present invention, the palletizing of unitized cubes can be done using a single robotic arm that is programmed to place adhesive patches at specific locations or uses a vision system to detect interfaces of boxes on the pallet and places adhesive patches at those respective locations.

Figure 7:
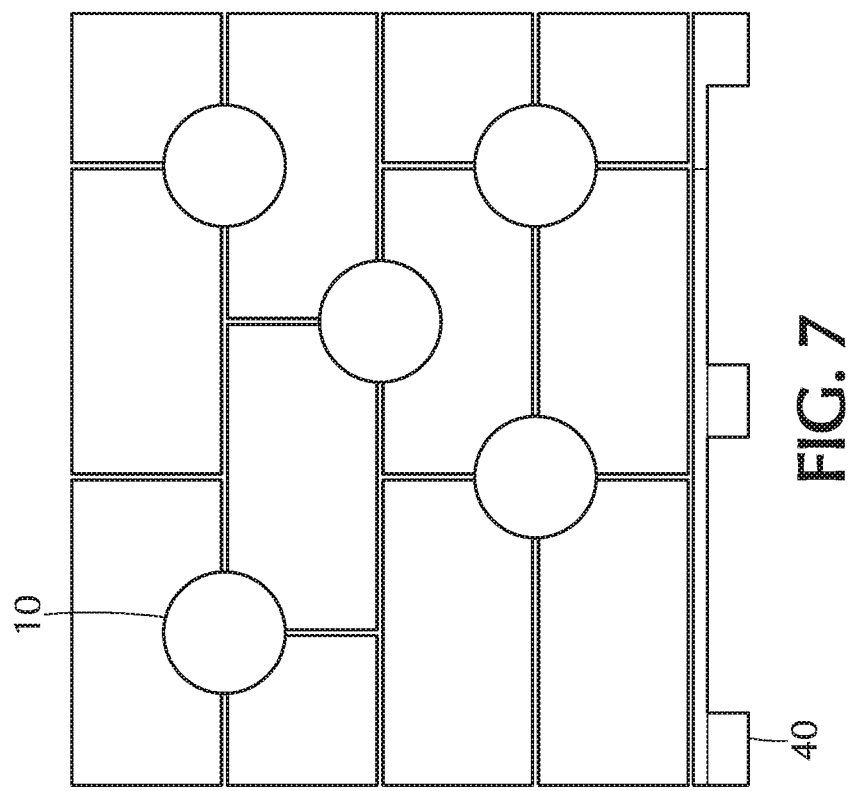
FIG. 7 is an end view of an alternative configuration of stacked unitized cubes on a full pallet.
Figure 6:
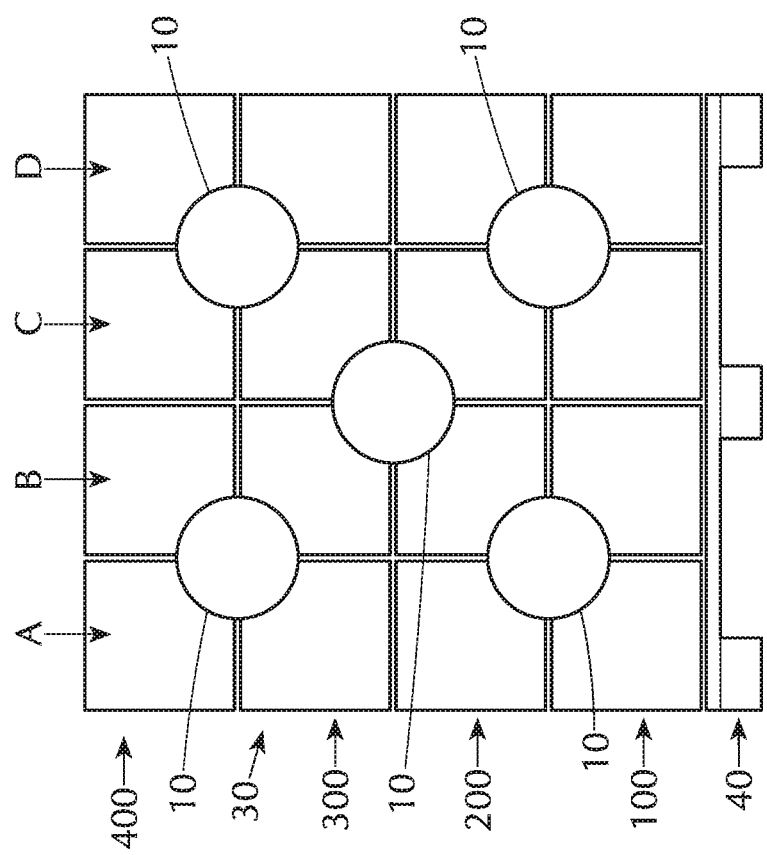
FIG. 6 is an end view of a full pallet of stacked unitized cubes.

Referring now to FIGS. 6 and 7, an adhesive patch 10 of the invention is placed at the intersection of four corners of the unitized cubes 30, which can subsequently placed on pallets 40. In the configuration shown in FIG. 6, the boxes have a similar cross-sectional dimension, and the adhesive patches 10 are arranged at the four-corner intersections of the boxes in a staggered configuration, both vertically and horizontally. In other words, at the junction of the boxes in rows 100 and 200, adhesive patches are located at the four corner intersection of columns A and B and the intersection of columns C and D. There is no adhesive patch located that the four corner intersection of columns B and C and rows 100 and 200. This staggered configuration continues at the intersection of rows 200 and 300, where the vertical intersection of columns A and B and the intersection of columns C and D at the four corners between rows 200 and 300 do not contain an adhesive patch, but the intersection at columns B and C at the four corners between rows 200 and 300 does contain an adhesive patch 10. Moving to horizontal rows 300 and 400, the four corner intersection between rows 300 and 400 and columns A and B and columns C and D contains an adhesive patch, while the intersection of the four corners of rows 300 and 400 and columns and columns B and C does not contain an adhesive patch. As can be seen from FIG. 6, this results in a pattern in which the four corner intersection of box corners along diagonals of the unitized cube 30 are covered with adhesive patches. This configuration of patches can be referred to as a vertically and horizontally staggered arrangement of patches at the four corner intersections of boxes.

In FIG. 7 another staggered configuration is shown, but with boxes of different cross-sectional size. Again, in the configuration shown in FIG. 7, the bottom two rows of boxes 100 and 200 have adhesive patches 10 at every vertical intersection of box corners, but at the vertical intersection of box corners between rows 200 and 300, every other vertical intersection of box corners is covered by an adhesive patch 10. A similar pattern is repeated at the vertical intersection of box corners between rows 300 and 400 results in an overall staggered configuration of adhesive patches vertically and horizontally.

Figure 8:
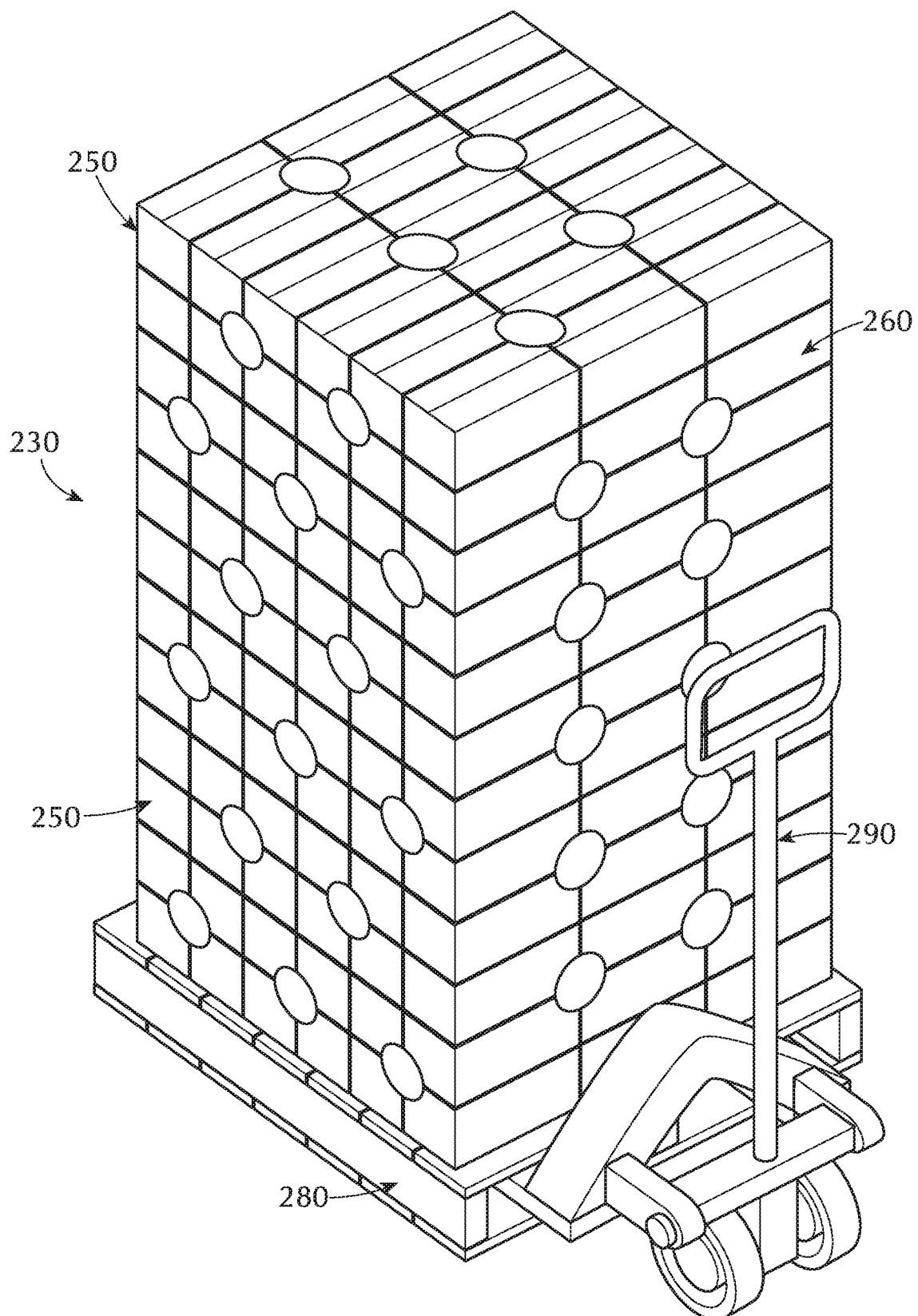
FIG. 8 is a perspective view of an alternative configuration of a full pallet of stacked unitized cubes.

Such a staggered configuration as shown in FIG. 6 is also shown in FIG. 8. FIG. 8 shows a unitized cube 230 comprising twelve horizontal rows comprising six boxes stacked upon each and six vertical columns of twelve boxes stacked adjacent each other on the side face 250 of the unitized cube 230 is shown. The individual boxes are rectangular and on the front and rear faces 260 comprise twelve horizontal rows comprising three boxes stacked upon each and three vertical columns of twelve boxes stacked adjacent each other stacked adjacent each other. The unitized cube 230 is stacked on a pallet 280, which is moved by the pallet truck 290 shown in FIG. 8. As will be appreciated from FIG. 8, the same staggered configuration of adhesive labels is used as in FIG. 6 in which alternating vertical and horizontal four corner intersections of boxes are covered in alternating row and column intersections on the side face 250. On the front face 260, alternate horizontal rows contain adhesive patches in a non-staggered configuration. Such a packaging arrangement in which the side faces of the unitized cube are adhesively secured by patches in a staggered configuration as described above has successfully passed initial loading and unloading tests of a unitized cube 230 as shown.

It is also contemplated to use the adhesive patches in combination with other packaging solutions. For example, the cube pack made using adhesive labels can be palletized using conventional stretch wrap or other palletizing solutions. In one or more embodiments, the adhesive patch of the present invention may be used in combination with the existing conventional packaging products, e.g., shrink wrap or other packaging technologies. For example, in one embodiment, the adhesive patches could be used to connect or group unitized cubes of products and subsequently stretch wrap foil or tape may be used to group multiple cubes on a pallet. Use of the adhesive patch of the present invention in combination with other conventional approaches allows for pallet stabilization, pallet protection, and box protection including protection from environmental factors and external loads.

The adhesive patch and method of use thereof in a packaging system may be used with a conventional pallet constructed from wood or laminated corrugated material may be used with the is provided with sufficient size to arrange a plurality of items in side-by-side arrangement thereon.

To maximize pallet volume, conventional pallet configuration patterns and systems, which work cooperatively with robots, may be used to rotate the boxes 90 degrees around horizontal and vertical axes relative to the box on which they are placed to obtain more pallet and space efficiencies. In one specific embodiment, the boxes may be added in layers of assembled unitized cubes to a pallet in columnar fashion. That is, such systems may add the assembled cubes to pallets by stacking additional assembled cubes directly atop of cubes already placed on the pallet. This technique results in pallets made up of a series of columns. The series of columns must be in linear alignment with the assembled cubes placed on the pallet below it. Pallets built in columnar fashion, however, can be unstable and subject to collapse. In fact, pallet instability often increases with column height. It is also contemplated that methods of arranging cubes in interlocking layers which resemble the layers of bricks within a masonry wall may also be used in the present invention. In a preferred embodiment of the present invention, the assembled unitized cubes are arranged in columnar fashion on a pallet.

One of the advantages of the invention is that column stacks of boxes or articles can be made since adhesive patches interconnect the unitized cube of boxes forming the pallet load at intervals during the building of the palletized load thus increasing the stack integrity. By allowing column stacks, rather than the interlocked stacks of previously known palletizers, the inherent strength of the boxes or cartons can be utilized in order to create strong unified, unitized stacks of products. The adhesive patch and methods of use thereof of the present invention allow for greater stack height, heavier loads, more dense loading on a pallet using less packaging material than conventional packaging systems and resulting decreased shipping costs, decreased damage to the products resulting from collapse of the boxes on the lower levels of the stack, and decreased resultant waste providing environmental benefits.

Adhesive patches may be constructed of conventional materials known to one of skill in the art in the packaging art including, but not limited to, paper, reinforcer or laminated paper, or plastic/polymer (single of multilayer films) or any combination of these materials.

Adhesive could be pre-applied to form a self-adhesive patch or applied separately (spray, roll or similar) to the box and/or patch before placing the patch on the predetermined location. Size and shape of the patch as well as adhesive strength of the adhesive may be optimized based numerical and experimental ship test simulations known to one of skill in the art.

In addition, adhesive patches of the present invention may also provide a labeling function to carry important product information. The adhesive patch also enables branding information to be displayed on a unitized cube or pallet. In one or more embodiments of the present invention, information such as product information, branding and similar desired information may be printed on the adhesive patch before or after its application.

In one or more embodiments of the present invention, the adhesive patch can also contain embedded or attached sensor devices which could detect exposure of the shipment to extreme temperatures, radiation, moisture or similar. In one or more embodiments of the present invention, the adhesive patch could have embedded electronic components for scanning, detecting, product counting or similar purposes. In a preferred embodiment, a radio frequency identification (RFID) sensor is embedded into the adhesive patch of the present invention for scanning, tracking, detecting, product counting or similar purposes.

In one or more embodiments of the present invention, the adhesive patches provide evidence for proof of interference or alteration of the pallet. In a preferred embodiment, the adhesive patch will need to be separated from the box surface or cut when boxes are needed to be separated from the pallet or cube, thereby providing evidence of tampering with the cube or pallet, eg. instances where shipping pallet loads of product are dismantle and reassemble pallets to obtain greater transportation efficiencies.

The adhesive patch of the present invention has dimensions of about 0.03-20 inches in width, about 0.03-20 inches in length, and about 0.03-20 inches in diameter. It is understood that the present invention allows adjustments to the length, width and diameter of the adhesive patch depending upon the specific application, size of the box, and weight upon loading of the boxes.

It is known in the prior art that in palletized loads, once the unit load is broken to remove even one or two of the rectangular objects or packages, the structural integrity of the unit load is destroyed. The individual objects or boxes of the unit load then become difficult to move from one place to another and with the unit load broken, the possibility of pilferage, or loss of cartons due to cartons falling off of the pallet, is quite high.

Therefore a modularized pallet of square or rectangular boxes is desired as shown in FIGS. 6-8. The pallet load is comprised of a plurality of unitized cube of boxes. Each of the unitized cube of boxes comprises a parallel array of four boxes, the four boxes being stacked in side-by-side relationship. The unitized cube of boxes are arranged in a columnar fashion and stacked in side-by-side relationship to form a pallet load. Two or more adhesive patches are provided for interconnecting the unitized cube of boxes.

It will be understood that the configurations shown in FIGS. 1-8 are exemplary only, and other variations are within the scope of the invention.

In one or more embodiments of the present invention, a robotic arm having the capability of receiving unitized cubes of boxes from a source of supply may be used to transfer the unitized cubes of boxes on to a pallet. In one or more embodiments of the present invention, a robotic arm may then provide an adhesive patch at the intersection of two or more unitized cubes of boxes in order to "build" a stable pallet load.

To remove a unitized cube from the pallet, the adhesive patches are severed and sufficient force is applied to the unitized cube to separate the unitized cube from the pallet. The unitized cube of four boxes is still bound together in rectangular or cube form by at least two adhesive patches and may then be transported from one location to another. The remainder of the pallet still forms an integral package that may be transported by forklift, or the like, from one location to another without concern for tampering, pilferage, or loss of one or more of the boxes during subsequent transport.

The adhesive patch may be removed from a substrate by gripping and pulling an edge of the patch, severing the patch with using conventional cutting means such as scissors or a utility knife, or by means of a pull tabs or tear strip incorporated with the body of the adhesive patch.

The adhesive is of a type known in the packaging field and has the characteristic that it has a significant or high strength component in a first lateral direction of the film, and this strength is effective to hinder or prevent relative horizontal movement of both the unitized cube of boxes and the assembled pallet of unitized cube of boxes. This provides stability in the columns of unitized cube of boxes on the pallet. The adhesive may be any suitable non-water soluble adhesive known in the art. An adhesive having a peel strength that is equal or greater than the cohesive strength of the substrate may be desired in one or more embodiments. In some embodiments of the present invention, an adhesive having a peel strength of 1 lbs. per inch or more such that the adhesive force between the patch and substrate is greater than the cohesive forces that characterize the substrate is desired. It is noted that an adhesive having an adhesive strength greater than the cohesive strength of the substrate will allow for detection of any evidence of tampering with said packaging.

Adhesives which may be used can be selected from tackified rubber-based adhesives like natural gums, olefins, silicones, polyisoprenes, polybutadiene, polyurethane, styrene-isoprene-styrene and styrene-butadienestyrene block copolymers and other elastomers showing low recovery, as well as tackified or non-tackified acrylic adhesives such as copolymers of isooctyl acrylate and acrylic acid, which may be polymerized by radiation, solution suspension or emulsion processes.

The surface area of the adhesive patch is from 0.09 inches$^2$ to 400 inches$^2$. The surface area of the adhesive patch will depend on several factors including, but not limited to, the size of the box, the weight of the boxes and the strength of the adhesive.

In one or more embodiments of the present invention, the diameter of the adhesive patch may be from 0.1 inches to 48 inches. In a preferred embodiment, the diameter of the adhesive patch is from 2 inches to 8 inches. The adhesive patch of the present invention can be provided in strips of varying lengths, in roll form, or in a stack.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed:

1. A method for stacking a plurality of stackable items onto a pallet comprising:
    (a) placing four boxes in stacked side-by side alignment having an intersection at the abutting four corners of the four boxes;
    (b) placing a first adhesive patch at the proximal side of the intersection of the four corners;
    (c) placing a second adhesive patch at the distal side of the intersection of the four corners to form a first unitized cube;
    (d) forming a second unitized cube by placing four additional boxes in stacked side-by side alignment forming an intersection at the abutting four corners of the four boxes;
    (e) placing a third adhesive patch at the proximal side of the intersection of the four corners of the second unitized cube;
    (f) placing a fourth adhesive patch at the distal side of the intersection of the four corners of the second unitized cube; and,
    (g) placing the first unitized cube on the pallet.

2. The method of claim 1, further comprising:
    (h) placing the second unitized cube in adjacent side-by side alignment with the first unitized cube on the pallet.

3. The method of claim 2 further comprising:
(i) repeating steps a) through h) to create a pallet load of unitized cubes;
(j) stacking the pallet load directly on top of each other to form vertical columns such that the corners of the boxes are stacked on top of each other from box to box; and
(k) repeating steps i and j) until the full desired height of the pallet load is achieved.

4. The method of claim 3, further comprising placing an adhesive patch at an intersection of four corners of the unitized cubes.

\* \* \* \* \*